April 18, 1967 C. MARCINKOWSKI 3,314,187
COLLAPSIBLE COMPACT CRAB TRAP
Filed Nov. 16, 1964
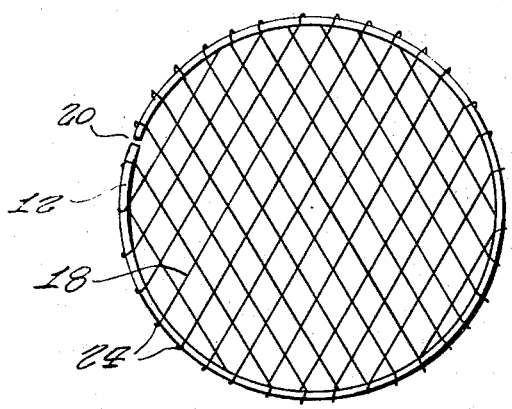
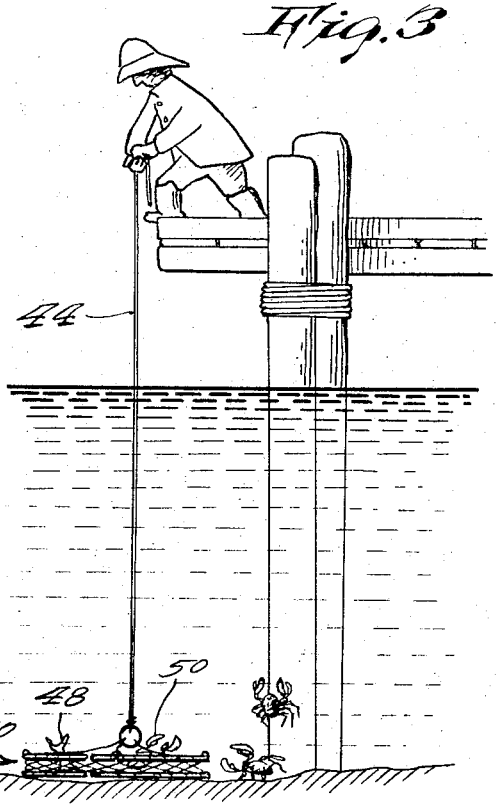
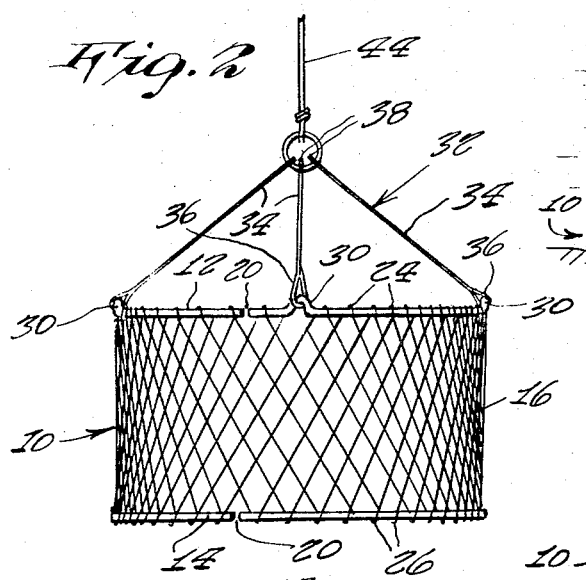
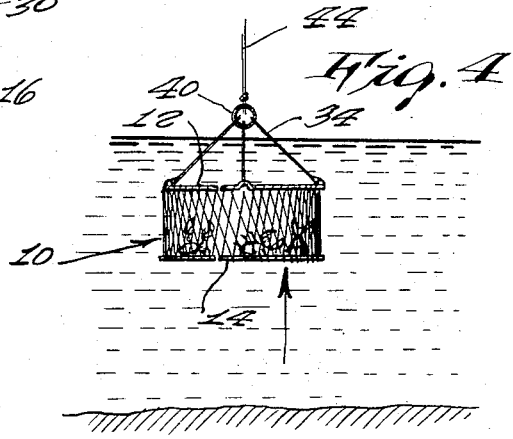
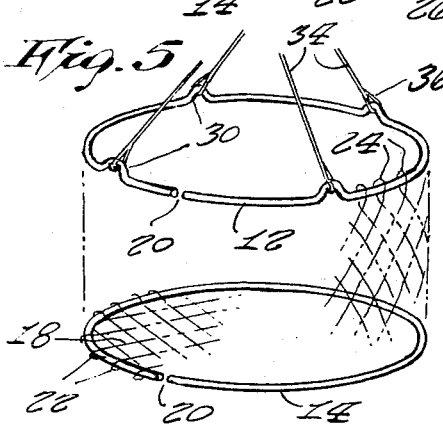
INVENTOR.
CLEM MARCINKOWSKI
BY Carl Miller
ATTORNEY

United States Patent Office 3,314,187
Patented Apr. 18, 1967

3,314,187
COLLAPSIBLE COMPACT CRAB TRAP
Clem Marcinkowski, 145 Hopkins Ave.,
Jersey City, N.J. 07306
Filed Nov. 16, 1964, Ser. No. 411,369
1 Claim. (Cl. 43—105)

The present invention relates to a crab trap and has for its primary object, to provide a collapsible crab trap comprising upper and lower ring frames interconnected solely by a net to form a cylindrical wall enclosure with the lower ring frame also having affixed thereto a net to provide a bottom for the enclosure, and with both nets formed of a flexible material such as to provide for ready collapse of the trap.

Another object of this invention is to form each of the ring frames of a heavy steel bar, circular in shape and with the opposed ends thereof spaced slightly apart to provide a narrow gap such as to permit threading of the net forming the cylindrical wall enclosure onto both the ring frames, as well as the bottom net onto the lower ring frame.

A further object of this invention is to provide in the upper ring frame a plurality of circumferentially spaced upwardly directed loops to each of which is connected one end of a flexible strand of a marline, the other end of each of said strands being secured to a common connector link to which the lower end of a lifting and lowering cable is attached for raising and lowering the trap.

Further objects of the invention will appear as the description proceeds.

To the accomplishment of the above and related objects, this invention may be embodied in the form illustrated in the accompanying drawings, attention being called to the fact, however, that the drawings are illustrative only, and that change may be made in the specific construction illustrated and described within the scope of the appended claim.

FIGURE 1 is a top plan view of the crab trap.

FIGURE 2 is an elevational view of the crab trap in its extended position for raising or lowering.

FIGURE 3 shows the crab trap in its collapsed position at rest on the bottom of a body of water.

FIGURE 4 is a view similar to that of FIGURE 2 showing the crab trap being raised upwardly through the water.

FIGURE 5 is a perspective view showing in detail the upper and lower ring frame construction.

Referring to the drawings in detail, it will be seen that the crab trap 10 is of cylindrical shape when extended, as shown in FIGURES 2 and 4, and is formed of an upper ring frame 12, a lower ring frame 14, a flexible collapsible wall net 16, and a bottom net 18. The ring frames 12 and 14 are preferably made of 5/16" steel bars, circular in section, and each formed into annular shape. A diameter of 18 inches has been found desirable. As will be seen in FIGURES 2 and 5, the opposed terminal ends of the steel bars making up each of the ring frames 12 and 14, are slightly spaced apart to provide a slit or gap 20 not less than 1/16 inch, for a purpose to be hereinafter described.

Constituting the bottom of the crab trap 10 is a net 18 which is woven of any suitable flexible material as for example nylon, into a circular shape, the periphery of which is provided with loops 22. The wall of the crab trap is similarly woven of the same flexible material in a cylindrical shape and at its top and bottom peripheral edges is provided with like loops 24 and 26. The wall net 16 and bottom net 18 are assembled first with the lower ring frame 14 by threading one end of the split lower ring frame 14 simultaneously through corresponding adjacent pairs of loops 26, 22, until all of the loops of both nets are positioned on the ring frame. Thereafter the upper split ring frame 12 is threaded through the loops 24 on the upper peripheral end of the wall net 16. This utilization of a separate wall and bottom net will permit removal of one or the other, or both, in an expeditious manner for storage, repair or replacement. This invention also contemplates a single one piece net of collapsible flexible material having the bottom portion woven integrally with the wall portion. Furthermore, the bottom net 18 need not in all instances be of flexible material as the same could be made of metal wire, as phosphorus, bronze or non-corroding metal, or even of hardware cloth provided with peripheral loops corresponding to the loops 22.

The upper ring frame 12 has formed therein a plurality of equally spaced upwardly directed loops or eyes 30. A marline 32 comprising four flexible strands 34, one for each eye 30, see FIGURE 5, has the lower end of each strand 34 provided with a loop 36 engageable with a corresponding eye 30, and with the upper end of each strand 34 provided with a similar loop 38, each engageable with a common lift ring element 40. Secured in any desired manner to the ring element 40 is the lower end of a lift cable 44.

The steel ring frames 12 and 14 are provided with a suitable rust preventing coating, and if so desired, may be made of a non-ferrous metal such as brass. Also, the lower ring frame 14 may be made heavier than the upper ring frame 12, as by utilizing a bar of greater cross-sectional diameter, such as to preclude shifting of the crab trap when seated on the river, lake or ocean bottom.

In use, a quantity of bait 48 is placed within the crab trap, see FIGURE 3, which is then lowered to the bottom of the body of water. Due to the flexible nature of the wall net 16, the crab trap 10 will collapse, with the upper ring frame 12 seating on the lower ring frame 14. Crabs 50 attracted by the bait will have no difficulty crawling over the collapsed wall of the crab trap. The bait 48 may be attached in any desired manner, such as to the bottom of net 18, preferably in the center thereof. Pulling up on the lift cable 44 will first elevate the upper lift frame 12 extending the wall net 16, see FIGURE 2, and thus trapping therewithin, the crabs.

While certain novel features of my invention have been shown and described and are pointed out in the annexed claim, it will be understood that various omissions, substitutions and changes in the forms and details of the device illustrated and in its operation can be made by those skilled in the art without departing from the spirit of the invention.

Having thus described my invention, what I claim is:

A crab trap comprising an upper split ring frame, a lower split ring frame, each split ring frame being formed of a single bar of metal stock with the lower split ring frame of a larger cross-sectional area to provide a split ring frame of greater weight, the terminal ends of the bar stock of each split ring frame being in opposed spaced apart relation to form a gap and with the opposed ends of each ring frame lying in the plane thereof, a continuous walled net of flexible collapsible material connected along the upper and lower peripheral edges thereof, respectively, to said upper and lower split ring frames, a separate bottom net connected along its peripheral edge to said lower split ring frame, a plurality of circumferentially spaced upstanding eyes on said upper split ring frame and integral therewith, a marline including a plurality of flexible strands, corresponding ends of said strands being each connected in spaced relation to an eye of said upper split ring frame, a lift ring element, the corresponding other ends of said strands being each connected to said lift ring element, and a lifting cable connected at one end to said lift ring element, both said walled net and bottom net having the peripheral edge strands thereof defining loops and the connection of said walled net and said bottom net respectively to said upper and lower split ring frames being effected by threading an end portion of a split ring frame through the loops in the peripheral edge of its associated net.

References Cited by the Examiner

UNITED STATES PATENTS

| | | | |
|---|---|---|---|
| 1,339,275 | 5/1920 | Mueller | 43—12 |
| 1,447,502 | 3/1923 | Asanio et al. | 43—100 |
| 1,526,822 | 2/1925 | Backer. | |
| 2,252,949 | 8/1941 | Schell | 43—7 |
| 2,591,891 | 4/1952 | Thorsen | 43—55 |
| 2,728,164 | 12/1955 | Mears | 43—105 |
| 3,030,725 | 4/1962 | Sandul | 43—12 |

FOREIGN PATENTS 113,282   2/1945   Sweden.

SAMUEL KOREN, *Primary Examiner.*

W. H. CAMP, *Assistant Examiner.*